United States Patent [19]

Kataoka

[11] Patent Number: 5,196,777
[45] Date of Patent: Mar. 23, 1993

[54] STEPPING MOTOR DRIVE CONTROL SYSTEM

[75] Inventor: Junnosuke Kataoka, Tokyo, Japan

[73] Assignee: Canon Kabushiki Kaisha, Tokyo, Japan

[21] Appl. No.: 648,867

[22] Filed: Jan. 31, 1991

[30] Foreign Application Priority Data

Feb. 13, 1990 [JP] Japan .................................. 2-31725

[51] Int. Cl.$^5$ .............................................. H02P 8/00
[52] U.S. Cl. .................................................. 318/696
[58] Field of Search ................ 318/696, 685; 358/498; 364/519

[56] References Cited

U.S. PATENT DOCUMENTS

| | | | |
|---|---|---|---|
| 3,899,729 | 8/1975 | Emery | 318/696 |
| 4,264,848 | 4/1981 | Jansen | 318/565 |
| 4,703,244 | 10/1987 | Takeuchi et al. | 318/696 |
| 4,814,789 | 3/1989 | Ono | 346/76 PH |
| 4,926,270 | 5/1990 | Sakamoto | 358/498 |

*Primary Examiner*—William M. Shoop, Jr.
*Attorney, Agent, or Firm*—Fitzpatrick, Cella, Harper & Scinto

[57] ABSTRACT

In a stepping motor drive control mechanism, a step drive command is applied sequentially at irregular intervals to drive a stepping motor. When the step drive command is to the stepping motor the stepping motor is driven by one step angle. According to the response characteristic of the stepping motor, an inhibited period when the reception of the next step drive command is inhibited and a reception period when the reception is enabled are set up. If the next step drive command is applied during the inhibited period, the system waits until the reception period. Then, the stepping motor is driven by one step angle.

6 Claims, 4 Drawing Sheets

STEPPING MOTOR DRIVE CONTROL SYSTEM

BACKGROUND OF THE INVENTION

1. Field of the Invention

The present invention relates to a stepping motor drive control system suitable for a facsimile system, or more particularly, to a stepping motor drive control system which optimizes precision in rotation of a motor.

2. Related Background Art

Stepping motors are used for sheet transportation in facsimile system. A stepping motor is driven by one step angle in response to a step drive command. The motor drive can be controlled so easily that sheet feed in a facsimile system can be done continuously or intermittently, or stopped temporarily, depending on the step drive command. The time from when a step drive command is provided to the stepping motor of a facsimile system until when the next step drive command is provided is rarely uniform and often variable. With a stepping motor, the intervals of step drive commands can vary largely. Therefore, the stepping motor has come to be used for a facsimile system.

FIG. 1 shows a general response characteristic of a stepping motor in a case where a stepping motor is driven with a step drive command. A rotor of the stepping motor attains to a stable state while converging vibrations. The stepping motor shows such a response characteristic. In a stepping motor employed for a prior facsimile system, a minimum response time shown at A in FIG. 1 is determined, and the next drive command is applied after time A when the rotor has attained a one step angle.

Therefore, the aforesaid prior stepping motor for facsimile systems would be effective for continuous drive control making the intervals of step drive commands uniform. However, when the intervals of step drive commands vary largely, the problems noted below attributable to the response characteristic of the stepping motor are inevitable.

When the intervals of step drive commands vary largely, a next step drive command may be applied during time B or time C in FIG. 1. During times B and C, the angular position of a rotor varies greatly. The directivity of the rotor varies largely, too. For sheet transportation in a facsimile system, the inertial force and backlash of a driving system are added. Comparing the operation when the next step drive command is applied during time B in FIG. 1 and the one when the next step drive command is applied during time C in FIG. 1, one sees that the operating states of a stepping motor are completely different. When the next step drive command is applied during time B in FIG. 1, the stepping motor is oriented in the rotating direction. Therefore, the operation of the stepping motor is stable. When the next step drive command is applied during time C in FIG. 1, the stepping motor is oriented inversely from the rotating direction. Therefore, the operations performed by the stepping motor are unstable. This causes noise and vibrations during sheet transportation in a facsimile system.

The aforesaid problems are negligible for an expensive system equipped with a stepping motor having a sufficient size and a highly precise structure, but they are very serious for a compact and low-price system.

Facsimile systems have become popular into our society. There is a growing demand for a compact and low-price system that performs with high precision. A stepping motor employed for such a system has been designed to be compact and low-price. Therefore, the aforesaid problems associated with the stepping motor employed for a compact and low-price facsimile system are gaining people's attention.

SUMMARY OF THE INVENTION

An object of the present invention is to solve the aforesaid drawbacks. More particularly, this invention attempts to provide a stepping motor drive control system which optimizes precision in rotation of a stepping motor which is driven with a step drive command applied at irregular intervals.

Another object of the invention is to permit high-precision sheet feed control using a compact and low-price stepping motor for sheet transportation in a facsimile system.

Other objects will be apparent in conjunction with the embodiments described below.

DESCRIPTION OF THE PREFERRED EMBODIMENTS

An embodiment of the present invention is described below in conjunction with the drawings. In this embodiment, a stepping motor is employed for sheet transportation in a facsimile system.

Figure 1:
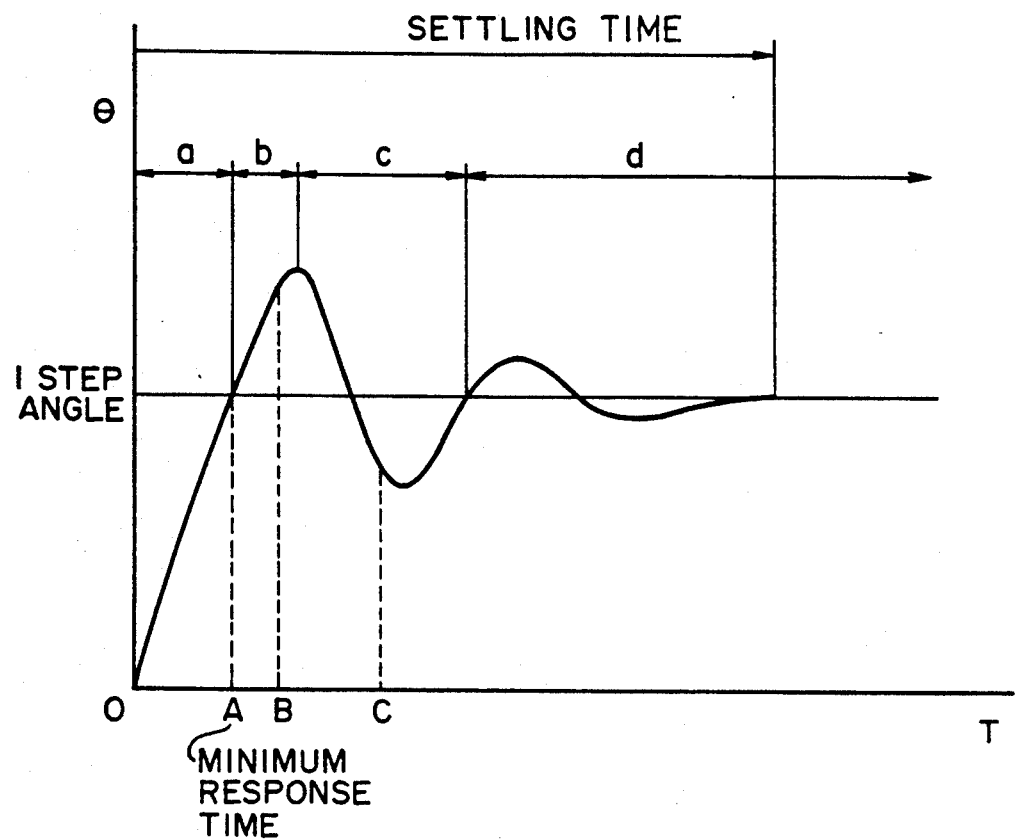
FIG. 1 shows a response characteristic of a stepping motor related to the present invention when the motor is driven with a step drive command.
Figure 2:
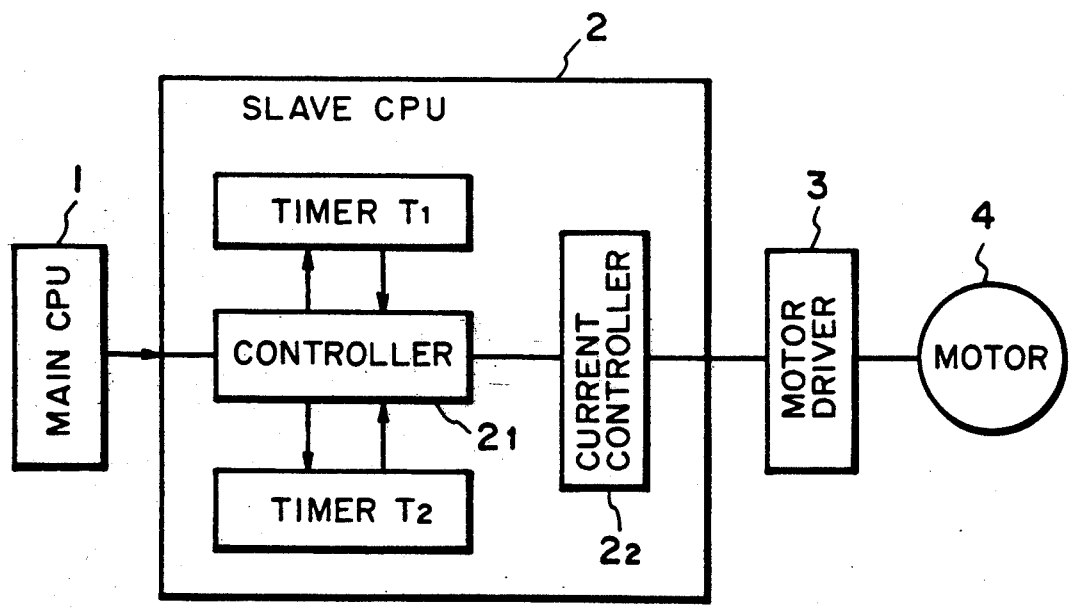
FIG. 2 is an electric block control circuit diagram for the stepping motor of a facsimile system embodying the invention.

FIG. 2 shows an electric block control circuit of a stepping motor for a facsimile system. 1 denotes a main CPU. 2 denotes a slave CPU having timers T1 and T2, a controller $2_1$, and a current controller $2_2$. The timers T1 and T2 in the slave CPU 2 are initialized at the start of a communication. The timer T2 is set to a minimum response time. 3 denotes a motor driver, and 4, denotes a stepping motor. The stepping motor 4 is driven by one step angle with a step drive command. Depending on the way the main CPU 1 provides step drive commands, the stepping motor 4 performs drive control such that sheet feeding in the facsimile system will be done continuously or intermittently, or stopped temporarily. In a facsimile system, the main CPU 1 provides the step drive command for driving the stepping motor 4 at irregular intervals. This is because the time from one step drive command to the next step drive command is rarely uniform and often variable. The intervals of step drive commands vary greatly. Therefore, the main CPU 1 provides the step drive command in such a way that the minimum response time is determined as A in FIG. 1, and then the next step command is applied at time A when the rotor attains a one step angle.

The slave CPU 2 sets the phase excitation timing for the motor driver 3 and controls current when a step drive command is applied by the main CPU 1. With the timers T1 and T2 are installed, the salve CPU 2 receives the step drive command or inhibits the reception thereof. These timers monitor whether the time from the previous step drive command is within an inhibited period or a reception period, when the second or subsequent step drive command is sent from the main CPU 1 to the slave CPU 2. The inhibited period when the reception of the step drive command is inhibited and the reception period when the reception is enabled are determined according to the response characteristic of the stepping motor 4 shown in FIG. 1. Taking into account the position and directivity of the rotor of the stepping motor 4, a period when the operations of the stepping motor 4 are stabilized is defined as the reception period, and a period when the operations are unstable, as the inhibited period. A period a when the orientation of the rotor coincides with the rotating direction of the stepping motor but the angular position of the rotor has not attained a one step angle is the inhibited period. A period b when the orientation of the rotor coincides with the rotating direction of the stepping motor and the angular position of the rotor has attained or goes beyond one step angle is the reception period. A period c when after the rotor oscillates at the period b, the orientation of the rotor does not coincide with the rotating direction of the stepping motor or the angular position of the rotor does not attain a one step angle is the inhibited period. A period d when the directivity of the rotor becomes very weak and the angular position of the rotor converges at one step angle is the reception period.

Figure 3:
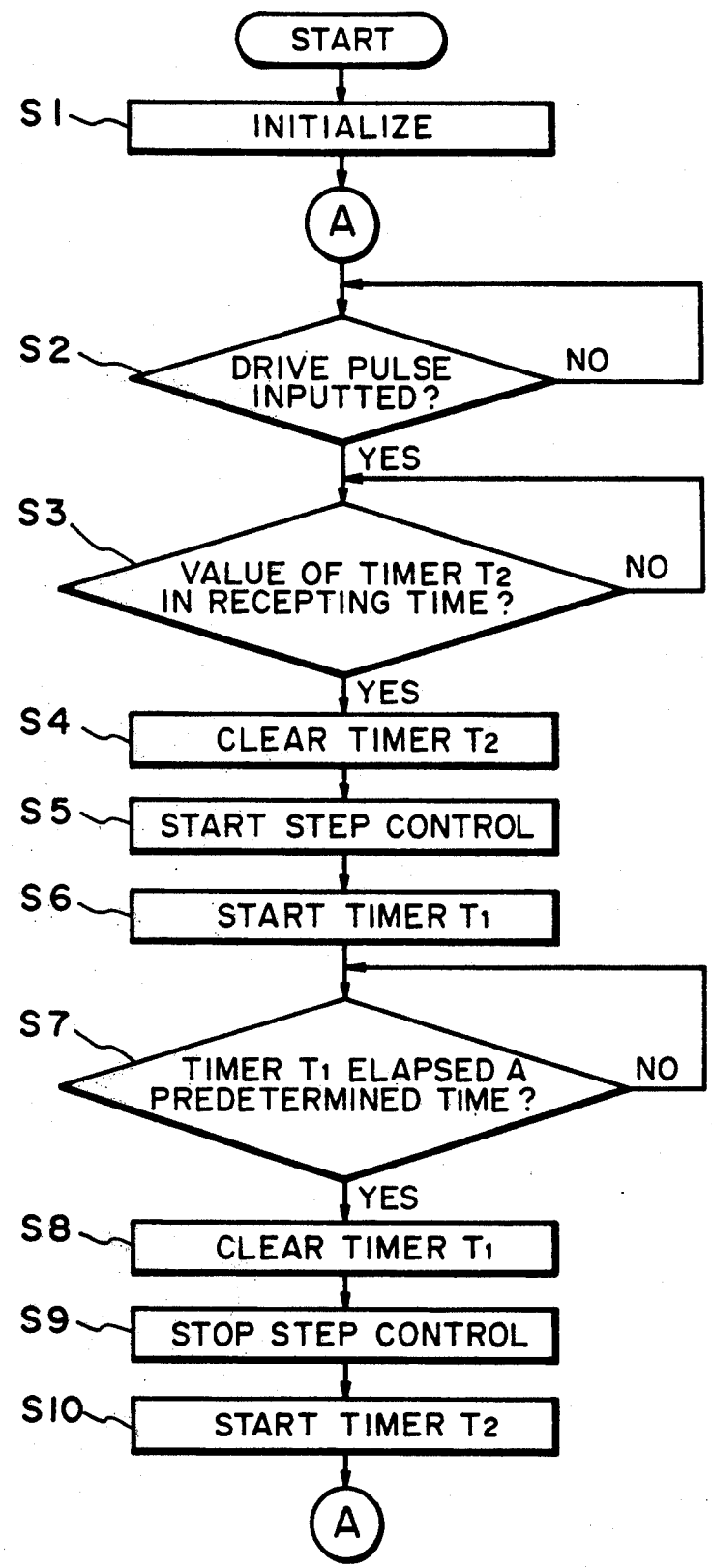
FIG. 3 is a flowchart of the control circuit shown in FIG. 2.

The operations of the aforesaid configuration are described using the flowchart shown in FIG. 3. First of all, assume that the main CPU 1 issues a first step drive command to a slave CPU 2.

A facsimile communication starts. With a start signal, timers T1 and T2 are initialized at a step S1. At a step S2, a main CPU 1 applies a step drive command to a slave CPU 2. At a step 3, it is determined if the timer T2 value indicates a reception time. The value of the initialized timer T2 represents a minimum response time. Therefore, control is passed to a step S4. Then, the timer T2 is cleared to zero. At a step S5, a step control operation is started. That is to say, a current controller is actuated to enable the stepping motor 4 to start a one-step angular motion. At a step S6, the timer T1 starts to perform a counting operation. At a step S7, the timer T1 is left intact until the time, required for the stepping motor 4 to make a multi-step angular motion according to a step angle mode of the stepping motor 4, has elapsed. At a step S8, the timer T1 is cleared to zero. At a step S9, the step control operation is stopped. Then, the timer T2 starts to perform the counting operation at a step S10.

Next, assume that the main CPU 1 applies the second or subsequent step drive command to the slave CPU 2. In this case, the operating sequence starts at the step S2. At the step S2, the main CPU 1 applies the second or subsequent step drive command to the slave CPU 2. At the step S3, it is determined if the timer T2 value indicates the reception period. If it indicates the reception period, control is passed to the step S4. If the timer T2 value indicates an inhibited period, the system waits until the timer T2 value indicates the reception period. When the reception period comes, control is passed to the step S4. The operations at and after the step S4 are identical to those when the first step drive command is applied to the slave CPU 2. Therefore, the description thereof is omitted.

Thus, when the second or subsequent step drive command is given to the slave CPU 2, the timer T2 counts the time passed after the previous step drive command. If the value indicates the reception period, the stepping motor is driven by one step angle. If the value indicates the inhibited period, the system waits until the timer T2 value indicates the reception period. When the reception period comes, the stepping motor is driven by one step angle.

Figure 4:
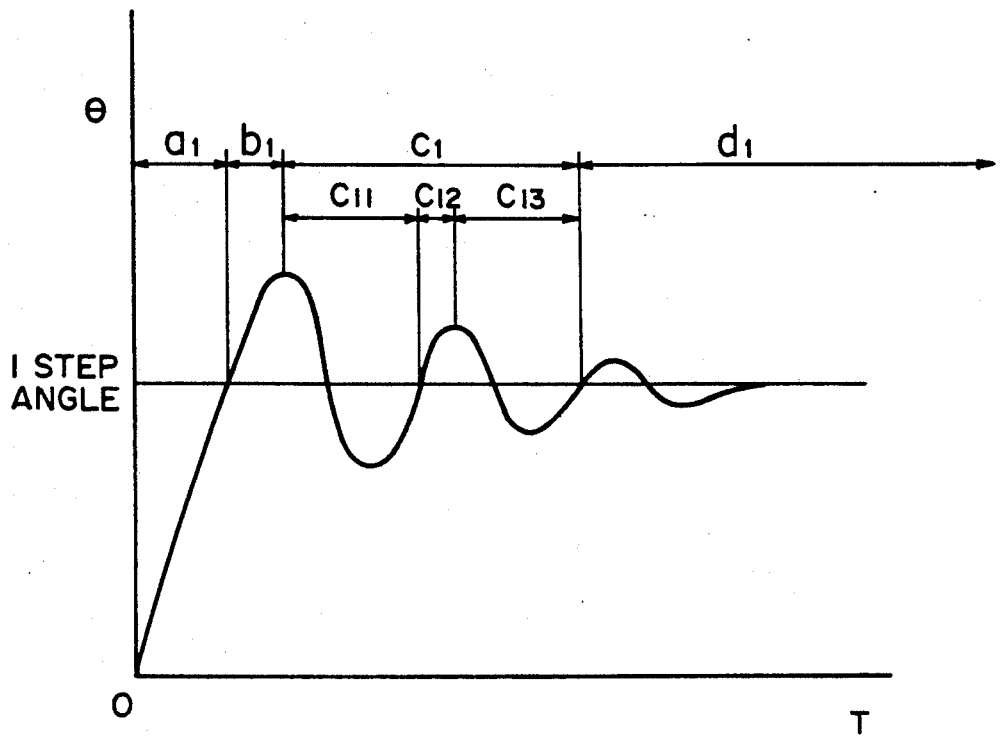
FIG. 4 shows a response characteristic of a stepping motor of an embodiment different from the one shown in FIG. 1.

In the aforesaid embodiment, the inhibited period, when the reception of the step drive command is inhibited, and the reception period, when the reception is enabled, is determined according to the response characteristic of the stepping motor shown in FIG. 1. The present invention is not confined to the response characteristic of the stepping motor. The response characteristic of any stepping motor causing diverse oscillations can be used. For instance, the response characteristic of a stepping motor shown in FIG. 4 can be used. When determining the inhibited and reception periods, consideration must be taken into account of the position and directivity of the rotor of the stepping motor. Then, a period when the operations of the stepping motor are stabilized is defined as the reception period. A period when the operations of the stepping motor are unstable is defined as the inhibited period. In FIG. 4, a period $a_1$ is defined as the inhibited period, and a period $b_1$, the reception period. In a period $c_1$, periods $c_{11}$ and $c_{13}$ are the inhibited periods, and a period $c_{12}$, the reception period. A period d is defined as the reception period. These periods are defined based on the same standards as those for FIG. 1. If all the $c_1$ periods are defined as the inhibited periods, the program contained in the slave CPU 2 can be simplified. As a result, the price of the facsimile system can be minimized.

Figure 5:
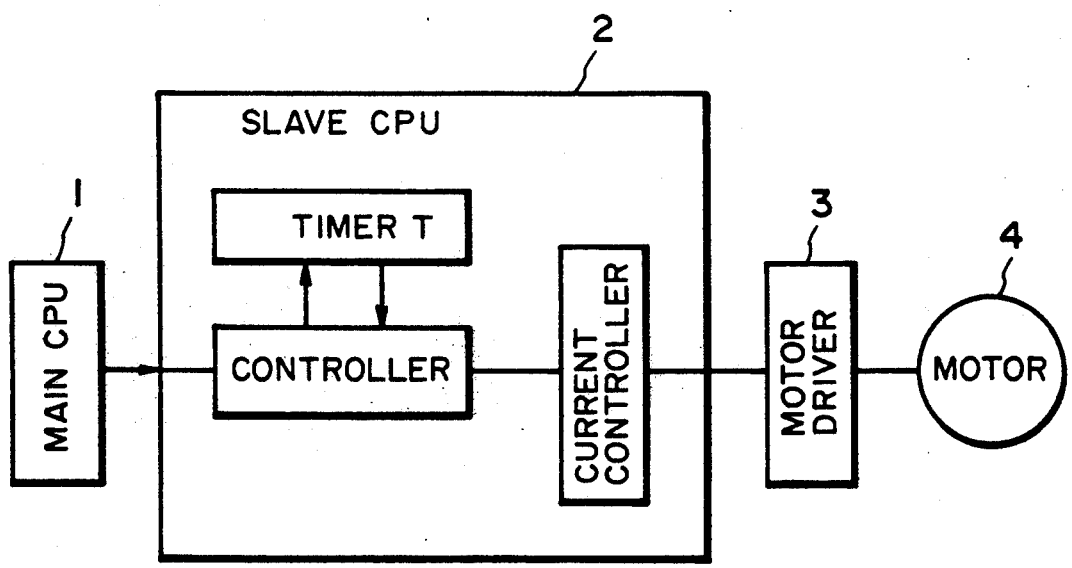
FIG. 5 is an electric control circuit diagram for the stepping motor shown in FIG. 2 which includes one timer.

Using the aforesaid embodiments, motor drive control for a stepping motor used for sheet transportation in a facsimile system is described. In the facsimile system, the sheet feed speed varies depending on the mode. Therefore, two timers T1 and T2 are needed. For a facsimile system operating only one mode, only one timer T is installed as shown in FIG. 5. The operations of the facsimile system are performed according to the flowchart shown in FIG. 6.

The operations of the aforesaid configuration are described below using the flowchart shown in FIG. 6. First of all, assume that a main CPU 1 applies the first step drive command to a slave CPU 2.

A facsimile communication starts. With a start signal, a timer T is initialized at a step S11. At a step S12, a main CPU 1 applies a step drive command to a slave CPU 2. At a step S13, it is determined if the timer T value indicates a reception time. The value of the initiated timer T represents a minimum response time. Therefore, control is passed to a step S14. Then, the timer T is cleared to zero. At a step S15, a step control operation is started. That is to say, a current controller is actuated to enable a stepping motor to start a one-step angular motion. At a step S16, the timer T is started to perform a counting operation. At a step S17, the timer T is left intact until the time required for the stepping motor to make a one-step angular motion has elapsed. At a step S18, the step control operation is stopped.

Next, assume that the main CPU 1 issues the second or subsequent step drive command to the slave CPU 2. The operating sequence starts at the step S12. At the step S12, the main CPU 1 applies the second or subsequent step drive command to the slave CPU 2. At the step S13, it is determined if the timer T value indicates the reception period. If the value indicates the reception period, control is passed to the step S14. If the value indicates an inhibited period, the system waits until the timer T value indicates the reception period. When the reception period comes, control is passed to the step S14. The operations at and after the step S14 are identical to those when the first step drive command is applied to the slave CPU 2. Therefore, the description thereof is omitted.

Thus, when the second or subsequent step drive command is applied to the slave CPU 2, the time T counts the timer passed after the previous step drive command. If the value indicates the reception period, the stepping motor is driven by one step angle. If the value indicates the inhibited period, the system waits until the timer T value indicates the reception period. When the reception period comes, the stepping motor is driven by one step angle.

As described previously, in a stepping motor drive control system according to the present invention, a step drive command is applied sequentially at irregular intervals to drive a stepping motor. With the step drive command applied, the stepping motor is driven by one step angle. According to the response characteristic of the stepping motor, an inhibited period when the reception of the next step drive command is inhibited and a reception period when the reception is enabled are set up. If the next step drive command is applied during the inhibited period, the system waits for the reception period. Then, the stepping motor is driven by one step angle. Therefore, the subsequent step drive operation can be performed at a good drive timing of the stepping motor. This helps stabilize the operations of the stepping motor. Thus, a stepping motor causing neither noise nor vibrations can be provided.

I claim:

1. A stepping motor drive control system for facsimile systems, comprising:
   a stepping motor for transporting sheets, the stepping motor being driven one step angle with every step drive command;
   a motor driver for driving said stepping motor;
   first control means for generating step drive commands upon starting a facsimile communication, said first control means generating a certain step drive command and a next step drive command at irregular intervals; and
   second control means for effecting control of current to said motor driver by receiving a step drive command from said first control means, said second control means determining, upon receiving the next drive command, if the time from reception of the certain step drive command to the next step drive command is within an inhibited time period or a reception time period, and when said second control means determines that the time is within the reception time period, said second control means receives the next step drive command and effects control of the current to said motor driver, wherein the reception time period in which said second control means receives a step drive command and the inhibited time period in which said second control means is inhibited from receiving a step drive command, are determined depending on the response characteristics of the stepping motor for one step drive command.

2. A stepping motor drive control system for facsimile systems according to claim 1, wherein the reception time period and the inhibited time period are determined according to the response characteristics of said stepping motor for one step drive command, taking into account the position and the direction of rotation of a rotor of said stepping motor, wherein said second control means makes a time period in which a rotational operation of said stepping motor is held stable the reception time period and wherein said second control means makes a time period in which a rotational operation of the stepping motor is unstable the inhibited time period.

3. A stepping motor drive control system for facsimile systems according to claim 2, wherein the reception and inhibited the periods for said second control means are set by a timer.

4. A stepping motor drive control system for facsimile systems according to claim 1, wherein said second control means has first and second timers, wherein said first timer is set to a given time required for a step control operation and wherein second timer is set to wherein reception and inhibited periods, and then said second timer is actuated after said first timer.

5. A stepping motor drive control system for facsimile systems according to claim 4, wherein said first and second timers are initialized upon starting the facsimile communication, and said second timer which is initialized is set to a minimum response time required for the rotor to rotate one step angle.

6. A stepping motor drive control system comprising:
   a stepping motor which is driven one step angle with every step drive command;
   a motor driver for driving said stepping motor;
   first control means for generating a certain step drive command and a next step drive command at irregular intervals; and
   second control means for effecting control of current to said motor driver by receiving a step drive command from said first control means, said second control means determining, upon receiving the next step drive command, if the time from reception of the certain step drive command to the next step drive command is within an inhibited time period or a reception time period, and when said second control means determines that the time is within the reception time period, said second control means receives the next step drive command and effects control of the current to said motor driver.

* * * * *

UNITED STATES PATENT AND TRADEMARK OFFICE
CERTIFICATE OF CORRECTION

PATENT NO. : 5,196,777
DATED : March 23, 1993
INVENTOR(S) : Junnosuke Kataoka

It is certified that error appears in the above-indentified patent and that said Letters Patent is hereby corrected as shown below:

ON THE COVER PAGE

At [57] Abstract

Line 4, "motor the" should read --motor, the--.

IN THE FIGURES

Sheet 2

Fig. 3, Step S3, "RECEPTING" should read --RECEPTION--.

Sheet 4

Figure 6:
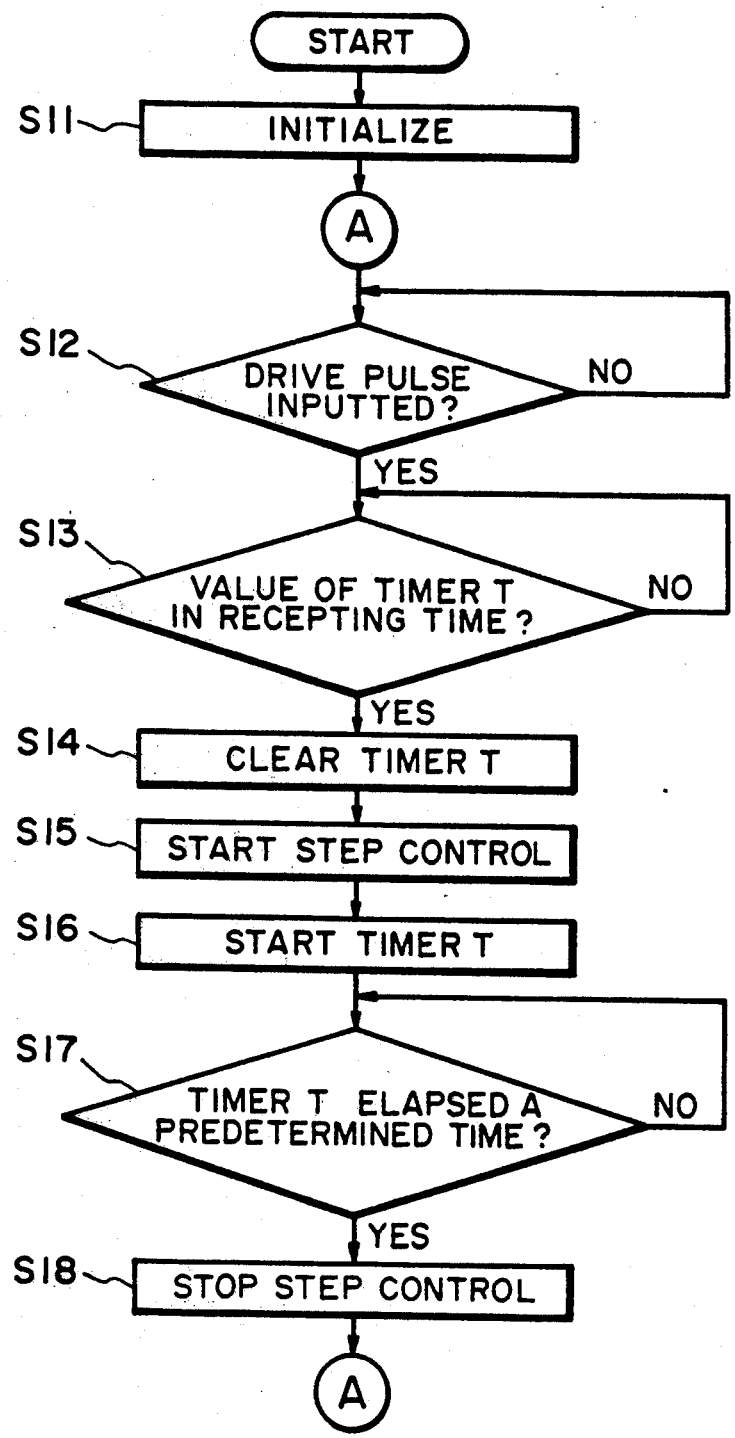
FIG. 6 is a flowchart of the control circuit shown in FIG. 5.

Fig. 6, Step S13, "RECEPTING" should read --RECEPTION--.

COLUMN 1

Line 12, "system." should read --systems.--.
Line 66, "into" should read --in--.

COLUMN 3

Line 4, "salve" should read --slave--.

COLUMN 4

Line 19, "the" should read --this--.

UNITED STATES PATENT AND TRADEMARK OFFICE
CERTIFICATE OF CORRECTION

PATENT NO. : 5,196,777
DATED : March 23, 1993
INVENTOR(S) : Junnosuke Kataoka

It is certified that error appears in the above-indentified patent and that said Letters Patent is hereby corrected as shown below:

Column 6

Line 26, "the" should read --time--.
    Line 32, "wherein" should read --wherein said--.
    Line 33, "wherein" should read --the--; and "periods," should read --time periods,--.

Signed and Sealed this

Twenty-second Day of March, 1994

Attest:

BRUCE LEHMAN

Attesting Officer     Commissioner of Patents and Trademarks